Dec. 28, 1965   J. P. SHANOK ETAL   3,226,287
COMPOSITE STRIP
Filed Sept. 15, 1960
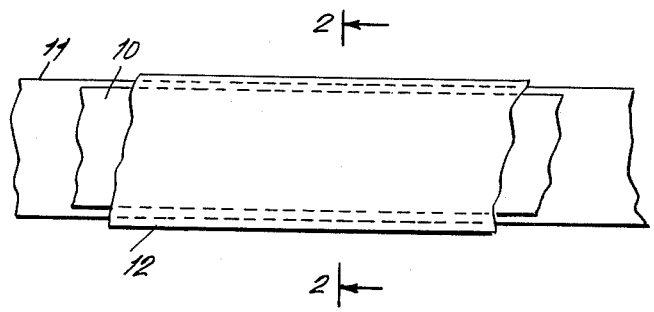
FIG. 1
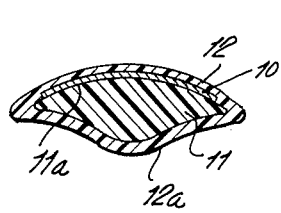   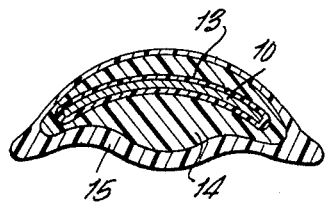
FIG. 2   FIG. 3
INVENTORS
JESSE P. SHANOK
VICTOR SHANOK
BY
ATTORNEY

United States Patent Office 3,226,287
Patented Dec. 28, 1965

3,226,287
COMPOSITE STRIP
Jesse P. Shanok and Victor Shanok, both of 863 65th St., Brooklyn 20, N.Y.
Filed Sept. 15, 1960, Ser. No. 56,245
3 Claims. (Cl. 161—175)

This invention relates to a composite decorative trim strip assembly particularly adaptable for disposition in a flat or arcuate position.

In the art of forming such decorative strips it has been found desirable to provide a thin ribbon or tape of metal foil encased within a smooth-surfaced, transparent thermoplastic material which may be disposed in a variety of arcuate positions, the said thermoplastic material assuming a set so that it will remain in said arcuate position. With such an assembly, the transparent thermoplastic material will expose the metal foil to view, thereby providing the strip with the appearance of a highly polished metal finish.

One preferred thermoplastic material which may be employed in the aforesaid manner is cellulose acetate butyrate. However, when so used it has been found that flexure of the strip longitudinally is resilient so that there is a strong tendency to recover from any deformed state in many instances, imposing substantial limitations upon its use.

In attempting to meet this difficulty, it was thought possible to encase the metal foil in a soft, elastic plastic such as a transparent vinyl plastic material. However, such a material does not present a hard, smooth surface and due to the possible deterioration of its surface finish thereof, does not long retain the desired metallic appearance produced by the encased metal foil. Moreover, the resiliency of such a material prevents the desired setting of the strip so that additional fastening means frequently become necessary for the permanent disposition of the strip in a desired arcuate position.

Therefore, in view of these problems, it is an object of the present invention to provide an improved decorative strip employing a metallic foil encased in a transparent plastic material and being capable of flexure without substantial risk of rupturing said metallic foil.

Another object of the present invention is to provide a strip of the character indicated which will present a smooth, hard surface finish.

Another object of the present invention is to provide a strip of the character indicated which is capable of flexure to a position wherein it assumes a permanent set without the necessity of employing additional fastening means.

A still further object of the invention is to provide a decorative strip of the character indicated which can be economically produced by conventional processes.

Other and further objects of the present invention will become apparent from the following description as read in connection with the accompanying drawing.

In the drawing:

FIGURE 1 is a plan view illustrating one embodiment of the present invention;

FIGURE 2 is a cross-sectional view taken about the line 2—2 of FIGURE 1 and looking in the direction of the arrows disposed in the vicinity of the ends of said line 2—2;

FIGURE 3 is a cross-sectional view depicting a modified form of the present invention.

As shown in FIGURES 1 and 2 of the drawing, one embodiment of the invention comprises a metal foil 10 supported by a transparent flexible foundation or core composed of a vinyl plastic or of other rubbery elastomeric substance. A smooth outer casing 12 composed of transparent cellulose acetate butyrate encapsulates the said foil 10 and vinyl foundation.

The foil may be composed of aluminum, thereby imparting to the assembly the appearance of a highly polished chrome or silver strip material. Furthermore, by tinting the outer casing 12, it is possible to produce gold, brass and colored effects. The tinting material or dye employed does not materially affect the transparency of the plastic and consequently, highly desired decorative effects may be achieved with the aluminum foil core. Thus, for example, tinting the plastic material amber or yellow, results in a strip which presents the appearance of polished brass or gold.

It should also be noted that the outer casing 12 also provides a sheath which protects the aluminum foil from external physical and chemical injury.

The outer casing 12 also permits the entire assembly to be flexed to a position wherein it will acquire a permanent set or deformation. The vinyl foundation 11 will yieldably conform to the position imposed by the outer casing and at the same time will yieldably support the metal foil 10. Since the vinyl foundation is soft, its surface 11a does not, in cooperation with the casing 12, grip the metal foil 10 so as to cause it to tear or rupture. Instead, by yielding to the flexure imposed upon the entire assembly and at the same time presenting a soft resilient surface to the metal foil, the stresses induced in said metal foil are relieved, thereby minimizing the possibility of rupture of said foil.

It will be noted that at least one continuous, longitudinal portion 12a of the casing must be relatively thick so as to insure the permanence of the desired deformation of the strip and so as to resist the tendency of the vinyl foundation 11 to return the strip to its original, undeformed condition.

The form of the invention described above may be produced by conventional extrusion processes well known to those skilled in the art of extrusion. In this connection, it may be desirable to assure the position of the metal foil during the extrusion process and to prevent the occurrence of any crinkling or other undesirable deformation of the metal foil during such process.

Accordingly, as depicted in FIGURE 3, the metal foil 10 may be initially encased in a thin coating or film 13 of transparent cellulose acetate butyrate. Said film 13 provides a protective sheath around the metal foil 10 which grips it sufficiently to preserve it in smooth, uncrinkled condition. This film 13 is enveloped and supported by a transparent vinyl foundation 14 which, in turn, is provided with an outer casing 15 composed of transparent cellulose acetate butyrate.

With this arrangement, the vinyl foundation 14 provides a soft, resilient support for the cellulose acetate butyrate coated foil so as to relieve the stresses induced therein by flexure and thereby minimize the possibility of rupture of the foil, the cellulose acetate butyrate coating being comparatively thin so as not to interfere with this rupture minimizing effect.

The outer casing 15 is formed similarly to the outer casing 12 provided in the form of the invention depicted in FIGURE 2, thereby insuring the capacity of the strip to assume a set or permanent deformation upon flexure and also providing a smooth surface finish.

The form of the invention depicted in FIGURE 3 may also be produced by conventional extrusion processes well known to those skilled in the art of extrusion.

The foregoing embodiments of the invention have been described to illustrate the principles involved. It will be apparent, however, that this invention is not limited to these embodiments and that changes, additions and modifications can be made in connection therewith without departing from the spirit and scope of the invention as herein disclosed and hereinafter claimed.

We claim:

1. An improved composite decorative strip comprising in combination, a soft, resilient core in supporting contact with a metal foil member, the said core and foil member being provided with a smooth transparent outer casing, completely enclosing said core and the said outer casing being permanently deformable, whereby the composite decorative strip assumes a permanent set.

2. An improved composite decorative strip comprising in combination, a soft, resilient core composed of a resilient vinyl plastic material in supporting contact with a continuous metal foil member, the said core being transparent, the said core and foil member being completely enveloped by a smooth transparent outer casing composed of cellulose acetate butyrate, the said cellulose acetate being permanently deformable, whereby the composite decorative strip assumes a permanent set.

3. A device according to claim 1, said foil member being completely encapsulated by a transparent inner casing, and said encapsulated foil being enveloped by said core.

References Cited by the Examiner

UNITED STATES PATENTS

| | | | |
|---|---|---|---|
| 2,319,445 | 5/1943 | Crowe | 20—74 |
| 2,571,372 | 10/1951 | Martin | 160—78 |
| 2,716,788 | 9/1955 | Naramore | 20—69 |
| 2,775,811 | 12/1956 | Shanok et al. | 174—110 |
| 2,789,381 | 4/1957 | Belgard | 41—34 |
| 2,835,993 | 5/1958 | Whitehead | 154—46 |
| 2,994,958 | 8/1961 | Beeber | 41—22 |
| 3,013,919 | 12/1961 | Bialy | 154—53.6 |
| 3,046,174 | 7/1962 | Brooks et al. | 154—52.1 |
| 3,086,216 | 4/1963 | Brooks et al. | |

OTHER REFERENCES

Schildknecht: "Vinyl and Related Polymers," 1952, pp. IX and XI cited.

Modern Plastics, November 1952, p. 226 cited.

Materials and Methods, June 1948, "Metal Coated Plastics Combine Advantages of Both Materials," p. 79 cited.

ALEXANDER WYMAN, *Primary Examiner.*

CARL F. KRAFFT, EARL M. BERGERT, *Examiners.*